June 12, 1923.
H. K. RAYMOND
VEHICLE TIRE
Filed Nov. 20, 1922
1,458,629
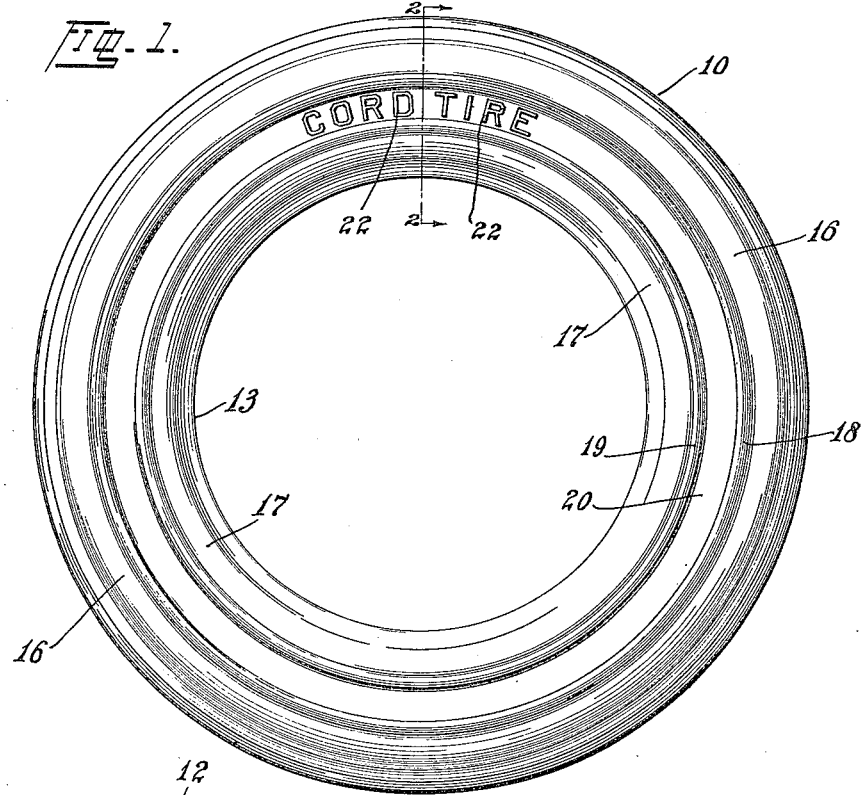
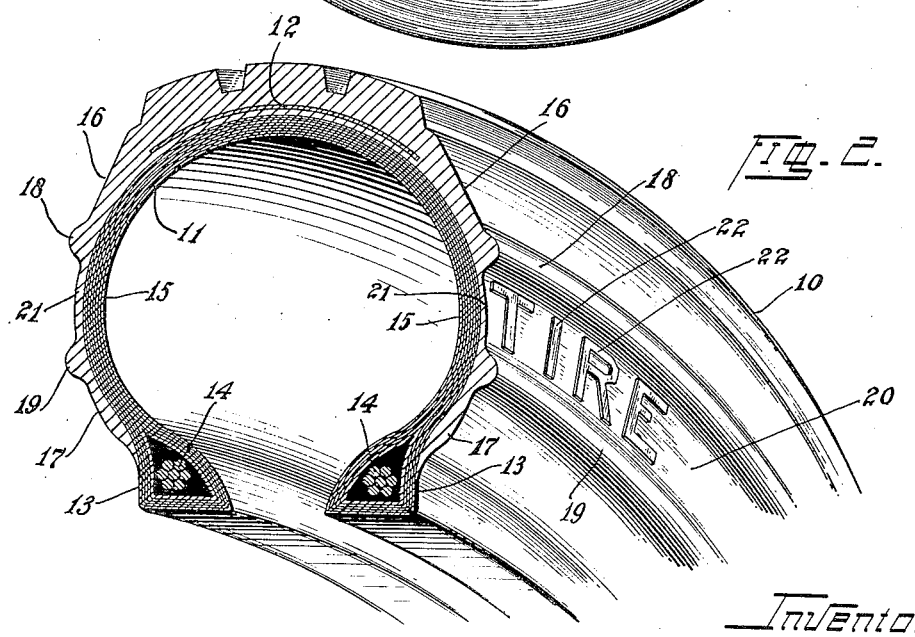
Inventor.
Harry K. Raymond.
By Robert McPierson
Atty.

Patented June 12, 1923.

1,458,629

UNITED STATES PATENT OFFICE.

HARRY K. RAYMOND, OF AKRON, OHIO, ASSIGNOR TO THE B. F. GOODRICH COMPANY, OF NEW YORK, N. Y., A CORPORATION OF NEW YORK.

VEHICLE TIRE.

Application filed November 20, 1922. Serial No. 601,968.

*To all whom it may concern:*

Be it known that I, HARRY K. RAYMOND, a citizen of the United States, residing at Akron, in the county of Summit and State of Ohio, have invented a certain new and useful Vehicle Tire, of which the following is a specification.

This invention relates to pneumatic vehicle tires and its general object is to provide a tire of improved durability, especially as relates to side-wall injuries such as result from contact of the side portions of the tire with curbs, ruts, etc. A further object is to prevent obliteration or defacement of trade marks, size markings, lettering and other designations such as are commonly molded on the side-walls of tires and which heretofore, so far as I am aware, have not been effectively protected from such damage. A further object is to obtain the advantages of side-wall protection with a minimum of material and without unduly reducing the flexibility of the side-wall or otherwise departing, in general design, from accepted types of tires.

Of the accompanying drawings:

Fig. 1 is a side elevation of my improved tire in its preferred form.

Fig. 2 is a sectional perspective view of the same.

Referring to the drawings, 10 is a pneumatic tire, which may be, in general, of standard construction, having the usual carcass 11, breaker-strip 12 and bead portions 13, 13. While the tire here shown is of the straight-side type, having inextensible bead reinforcements 14, 14, my invention is not limited to this particular type of tire.

The side walls are of about the usual thickness and contour from the tread and from the beads almost to the widest part or bulge, 15, 15, of the tire, the portions of the side-walls referred to being designated 16, 16 and 17, 17. Thus, except at such side bulge, the tire conforms in all respects to types now established in the public demand. At short distances on each side of the line of greatest bulge, as regards the carcass 11, the side-wall is externally formed with a pair of rounded annular chafing ribs, 18, 19, of cushion rubber, extending longitudinally around the tire, the two ribs embracing or defining a channel 20, the floor of which is formed by a carcass-covering layer of rubber, 21, whose main or body portion is substantially no thicker than the layer of rubber covering the carcass immediately adjacent the ribs 18, 19 outside of the channel 20, on both the tread and the bead sides of said channel, and is preferably thinner than said layer at the tread side of rib 18, as shown, the thinness of said layer providing maximum flexibility of the tire body at the middle of the bulge. It is desirable that these ribs should be substantially continuous and they are here shown as fully continuous.

On the floor of the channel 20, here shown as being molded in relief on the body of the rubber covering, are designations 22, 22, the words "cord tire" being here used by way of illustration. There may be the usual additional embossed designations of name, tire size, trade-mark, etc., but the total area of embossing in the channel is relatively small as compared with the total area of the floor of said channel, so as to preserve the maximum flexibility of the side wall, save rubber and promote the dissipation of heat caused by flexing of the tire walls. The ribs 18, 19 protrude laterally from the tire immediately adjacent the lettering, on the respective sides thereof, so as effectively to protect the letters from abrasion or defacement from contact with the sides of ruts, stones, curbs and similar obstructions. The side-wall at the bulge is likewise protected by said ribs, while the maximum flexibility is retained, together with the most approved type of tire construction. Being positioned near the middle of the bulge of the tire, the ribs do not have to protrude far from the general contour of the tire in order to guard the zone embraced between them, and they may be of such small cross-sectional size as not to require an excessive amount of rubber.

I provide a rib on each side of the zone to be protected, for the reason that, in crowding a curb, for example, the two ribs serve to force inward the entire side wall of the tire, including the protected zone, until the reaction is sufficient to crowd the vehicle laterally, whereas a single rib, on either side of the protected zone, may deform the carcass only locally, without carrying all of the protected zone with it. The positioning of the ribs rather close together, or in other words having the channel 20 comparatively narrow, is important also in order that the protected zone may be compelled to recede laterally inward as a result of external pressure upon the ribs.

My invention is subject to modification within its scope, and I do not wholly limit my claim to the exact construction here shown.

I claim:

A pneumatic tire comprising a carcass and a covering of tread and side rubber vulcanized thereon and including a pair of concentric, annular, substantially-continuous, side chafing ribs embracing between them a zone over the side salient of the carcass having a width sufficient to include the usual molded designations, the floor of said zone being mainly a relatively-thin and highly-flexible portion of said rubber covering of substantially less projection than the ribs.

In witness whereof I have hereunto set my hand this 16th day of November, 1922.

HARRY K. RAYMOND.